United States Patent
Ballantyne

Patent Number: 5,675,095
Date of Patent: Oct. 7, 1997

[54] ROTATIONAL TORQUE SENSOR

[75] Inventor: W. John Ballantyne, Aurora, Canada

[73] Assignee: Canadian Space Agency, Canada

[21] Appl. No.: 497,700

[22] Filed: Jun. 30, 1995

[51] Int. Cl.$^6$ ................................ G01L 3/02
[52] U.S. Cl. ............... 73/862.325; 73/862.321; 73/862.328
[58] Field of Search .............. 73/862.321, 862.325, 73/862.328; 324/209, 207.23, 207.25

[56] References Cited

U.S. PATENT DOCUMENTS

| | | | |
|---|---|---|---|
| 2,621,514 | 12/1952 | Waugh | 73/862.328 X |
| 3,194,065 | 7/1965 | Wilson | 73/862.328 X |
| 3,505,865 | 4/1970 | Kihlberg et al. | 73/862.328 |
| 3,538,762 | 11/1970 | Parkinson et al. | 73/862.328 |
| 3,604,255 | 9/1971 | Bart | 73/862.328 X |
| 3,824,848 | 7/1974 | Parkinson | 73/862.328 |
| 4,020,685 | 5/1977 | Van Millingen et al. | 73/862.328 |
| 4,122,709 | 10/1978 | Brown et al. | 73/862.328 |
| 4,136,559 | 1/1979 | Brown | 73/862.328 |
| 4,347,748 | 9/1982 | Pierson | 73/862.28 X |
| 5,285,691 | 2/1994 | Baer | 73/862.325 |
| 5,301,559 | 4/1994 | Tsuji et al. | 73/862.325 X |
| 5,490,431 | 2/1996 | O'Mahony et al. | 73/862.325 X |

FOREIGN PATENT DOCUMENTS

| | | |
|---|---|---|
| 7057227 | 4/1982 | Japan . |
| 0714182 | 2/1980 | U.S.S.R. . |
| 2095841 | 10/1982 | United Kingdom . |

*Primary Examiner*—Richard Chilcot
*Assistant Examiner*—Elizabeth L. Dougherty

[57] ABSTRACT

A torque measuring apparatus that uses proximity devices coupled to reference rings on input and output shafts that have periodically undulating circumferential boundaries. The regular changes in the proximity of the circumferential surfaces to their proximity sensors is used to determine torque.

9 Claims, 2 Drawing Sheets 5,675,095

ROTATIONAL TORQUE SENSOR

FIELD OF THE INVENTION

This invention relates to the measurement of torque being transmitted through a rotating shaft or rotational coupling.

BACKGROUND TO THE INVENTION

The measurement of the torque present in a rotating shaft or rotational coupling can be effected through strain gauges if connections to the shaft are permissible. In many applications, however, it is desirable to extract a torque measurement without actually contacting the torque transmitting structure.

This requirement exists not only with respect to rotating shafts but also stationary shafts that are transmitting a torque.

A variety of remote sensing and proximity detection systems exist, including for example, those based upon Hall effect devices, capacitance sensors, lasers, and eddy current sensors. Although the invention described hereafter can function with any suitable proximity detector, the eddy current sensor is a preferred device.

Eddy-current sensing is a technique whereby the presence of a conducting body within an oscillating magnetic field may be sensed. The induction of an eddy current within the conducting body presents itself to the circuit generating the alternating magnetic field as an inductive and resistive impedance apparently present in the primary circuit. The proximity and volume of the conducting body are parameters which will effect the apparent measured impedance. Thus, the measurement of the effects of eddy currents on circuit impedance can serve to measure the distance between a field source and a conducting body.

U.S. Pat. No. 5,295,399 describes a force/moment sensor based on a non-contacting proximity detection principle. In particular, it describes use of pairs of target/sensing assemblies placed between two resiliently coupled rings to effect detection of displacements occurring between these two bodies when placed under load, i.e.: subjected to differential moments and forces. Amongst the stress conditions measured is the torque that is developed between the two rings. A distinguishing characteristic of this prior art concept is that the target/sensing assembly is located between the rings. Furthermore, the parts of such assembly are carried by the rings, and the rings are not intended to rotate.

A further U.S. Pat. No. 5,247,839 describes a torque sensor based upon optical encoders. In this prior art reference the source and driven shafts are connected by a resilient coupling. On either side of the coupling, the respective shafts are provided with discs that are perforated at their perimeters to serve as rotating shadow masks for optical beams being transmitted therethrough. The interruption of these beams provides signals which are processed to measure the twist angle occurring between the two shafts, and the corresponding torque being transmitted.

The invention described hereafter relates to a rotational variant on the pre-existing technology, suited to measuring torque present in, for example, a powered socket drive during torquing and at its torque limit.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

In a broad aspect the invention is directed to a torque measurement apparatus for measuring the torque being transmitted from a source shaft having a common central axis of rotation to a driven shaft through a resilient coupling, such apparatus comprising:

(1) first and second source and driven reference rings mounted respectively on the source and driven shafts about the resilient coupling, such reference rings having each an outer circumferential boundary surface which is periodically undulating in the radial direction;

(2) first and second proximity measurement sensors mounted externally to the source and driven shafts for measuring the changes in the radial distance of the two outer circumferential surfaces of the two reference rings from the central axis of rotation of the respective shafts; and (3) signal processing means responsive to the outputs of the proximity measurement sensors to provide an output which corresponds to the difference in the angular displacement of the two reference rings, thereby providing a measure of the torque being carried by the resilient coupling.

Detector pairs may be utilized, placed in phase quadrature, an arrangement that permits signals of sinusoidal waveform to be readily converted to a measure of angular displacement. Alternatively, the reference ring could be designed to generate a saw tooth waveform in a single detector, which is a direct measure of angular displacement within each periodic interval.

As a preferred arrangement, two pairs of field coil eddy current sensors are employed. Each pair of sensors is respectively associated with the driven and source reference rings, placed adjacent and facing the circumferential boundary surface of each ring which is electrically conducting. The coils within each pair are separated by an angular displacement from each other around the circumference of each ring by an amount that will produce a phase difference in their output signals equal to one quarter of a cycle in the periodic output being generated therein.

When two proximity sensors are so positioned to function at quadrature locations to each other, in terms of their output, i.e. their signals are 90 degrees out of phase, this facilitates signal processing and allows the system to provide a torque indication when locked-up in a non-rotating static mode.

The signal processing means then responds to the currents flowing through each of the four coils to provide an indication of their individual radial displacements from the boundary surface. These four displacement signals may be processed to yield the relative angular displacement of one ring with respect to the other ring.

A preferred form of shape for the undulating outer circumferential surface of each ring is in the form of periodically spaced protrusions that are generally sinusoidal in profile. Such a shape profile is useful because the outputs from the sensors vary sinusoidally, and such outputs may be manipulated readily by the signal processing means to determine the "twist" that develops between the reference rings.

It is preferable for a large number of protrusions to be present on the circumferential surfaces. This permits the measurement of torque to be made at relatively small angular intervals of rotation of the shafts. It also increases the sensitivity of the system by increasing the degree of change in radial displacement of the outer surfaces with small amounts of rotation of the reference rings.

When the differential rotation of the reference rings exceeds the interval between protrusions, the signal processing means must accommodate the passage of multiple periodic undulations. This can be effected by providing pulse counting and directional sensing circuitry which provides its output to the signal processing means to allow it to include the angular shifts arising from each protrusion or undulation passed by the sensors.

By a further feature of the invention the outer circumferential surfaces on the reference rings may extend longitudinally, in the direction of rotation of the shafts, for a length that exceeds the effective sensing diameter of each proximity sensor. In such a case the eddy current sensors may be displaced longitudinally with respect to the reference rings while continuing to provide an output indication of the relative rotation occurring between the driven and source shafts. This feature is useful where the shafts have end play and carry aerial thrusts that reverse, as in the case of a propeller shaft.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
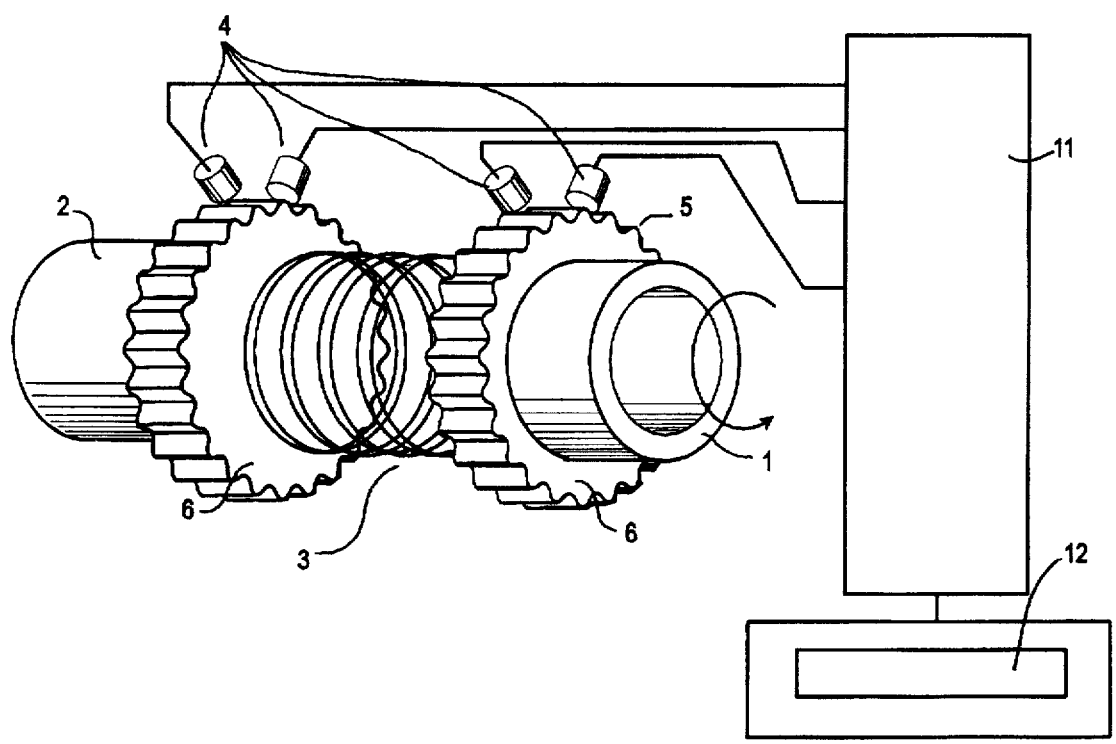
FIG. 1 is a pictorial perspective of a source and driven shaft, joined by a resilient coupling and carrying 4 eddy current sensors.

FIG. 1 shows source 1 and driven 2 shafts coupled by a helical spring which serves as a resilient coupling 3. Eddy current sensors 4 are mounted in pairs opposite the outer circumferential surfaces 5 of reference rings 6 carried by each shaft. These sensory 4 are connected to provide their outputs to a signal processing means 11 which then provides a final output 12 indicating the torque condition in the shafts. The sensors 4 in each pair are displaced along the circumferential surface from each other for reasons explained further, below.

Figure 2:
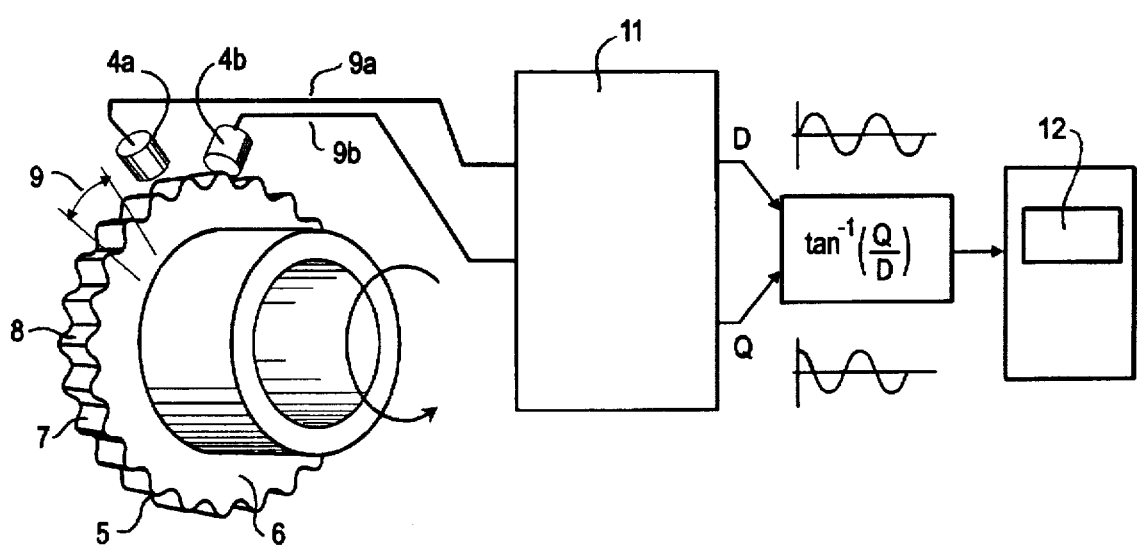
FIG. 2 is a pictorial perspective of a reference ring with two sensors, as carried by each of the shafts of FIG. 1.

In FIG. 2 a detail of a reference ring 6 is shown. The outer circumferential surface 5 has a periodically varying radial profile, shown as gear teeth 7, but preferably composed of sinusoidally varying protrusions 8. Each protrusion 8 associates with an interval 9 which, as the rings 6 turn, will product a cyclic output with a period corresponding to such interval. The sensors 4a, 4b are positioned so that their outputs 9a, 9b are 90 degrees out of phase. Their outputs 9a, 9b may be said to be in quadrature relation to each other.

Two signal processing modes may be employed to provide the twist angle output:

(a) an arctan conversion and differencing algorithm; and (b) differential detection with a root-sum-square algorithm.

The first system combines the outputs of the two sensors associated with each ring by dividing one by the other and taking the arctan of the results. This produces a value for the angular displacement of the reference ring within one periodic interval. Once this procedure has been applied to the outputs of both reference rings, the shift in the difference between the angles obtained when the coupling is loaded from when the coupling is not loaded is a measure of the torque being transmitted. The actual torque value can be obtained by correlating this angular displacement with precalibrated, linear scaling formula that provide the corresponding torque.

The second system referenced above pairs the sensors by selecting and associating the "direct" sensors from the source and driven reference rings together, and the "quadrature" sensors together. The differences in the outputs of each pair are then squared and added together. The square root of this result is equal to $2 \sin(d/2)$ which, for small angles approximates the difference angle "d" (or delta) being sought. Alternately, beyond small angled, a useful output can be obtained through the use of look-up tables. Again, this "twist" angle may be correlated with torque as provided above.

The use of two pairs of proximity sensors facilitates the signal processing procedure. It would be sufficient, however, to have only one proximity sensor 4 associated with each reference ring 6 if the reference rings provide a saw-tooth output that can be combined directly to produce the twist angle.

While two procedures have been shown for extracting a value for the shift in the angular displacement of the reference rings 6 have been shown, any known phase comparison means may be employed.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property are claimed as follows:

1. A torque measurement apparatus for measuring the torque being transmitted from a source shaft to a driven shaft having a common central axis of rotation through a resilient coupling, such apparatus comprising:

(1) first and second source and driven reference rings mounted respectively on the source and driven shafts about the resilient coupling, such reference rings having each an outer circumferential boundary surface which is periodically undulating in the radial direction;

(2) first and second proximity measurement sensor means mounted externally to the source and driven shafts for measuring the variation in the radial distance of the two outer circumferential surfaces of the two reference rings from the central axis of rotation of the respective shafts; and (3) signal processing means responsive to the outputs of the proximity measurement sensor means to provide a twist angle value which corresponds to the difference in the angular displacement of the two reference rings and, based upon such twist angle value, to provide an output indicating the torque being carried by the resilient coupling.

2. An apparatus as in claim 1 wherein the material of the reference rings at their outer circumferential boundary is electrically conducting and the proximity sensor means are eddy current sensing devices and for providing the signal processing means with a sensor signal in the form of the currents flowing through each of the four coils.

3. An apparatus as in claim 2 comprising two pairs of eddy current sensors, each pair of sensors being:

(1) respectively associated with the driven and source reference rings;

(2) placed adjacent and facing the circumferential boundary surface of each ring; and (3) separated by an angular displacement from each other around the circumference of each ring by an amount that will produce a phase difference in their output signals equal to one quarter of a cycle in the periodic output being generated therein, the signal processing means being responsive to the outputs of all four sensors.

4. An apparatus as in claim 3 wherein the undulating outer circumferential surface of each ring is in the form of periodically spaced protrusions that are generally sinusoidal in profile.

5. An apparatus as in claim 4 wherein the signal processing means operates by combining the outputs of the two sensors associated with each ring by dividing one by the other and taking the arctan of the results to produce values for the angular displacements of each reference ring within one periodic interval, the difference which is a measure of angular displacement between the reference rings to provide the torque being transmitted.

6. The apparatus of claim 5 wherein the actual torque value is obtained by correlating this angular displacement with a precalibrated, linear scaling formula that provides the corresponding torque.

7. An apparatus as in claim 4 wherein the sensors are paired by selecting one member each from the source and driven reference rings and wherein the signal processing means determines the differences in the outputs of each pair which differences are then squared and added together and then reduced to the square root of this result to approximate the angular difference between the reference rings.

8. The apparatus of claim 7 wherein the actual torque value is obtained by correlating this angular displacement with a precalibrated, linear scaling formula that provides the corresponding torque.

9. An apparatus as in claim 1 wherein outer circumferential surfaces on the reference rings extend longitudinally, in the direction of rotation of the shafts, for a length that exceeds the effective sensing diameter of each proximity sensor, such that the eddy current sensors may be displaced longitudinally with respect to the reference rings while continuing to provide an output indication of the relative rotation occurring between the driven and source shafts.

* * * * *